(12) United States Patent
Wiegelmann

(10) Patent No.: US 10,160,352 B2
(45) Date of Patent: Dec. 25, 2018

(54) MOTOR VEHICLE SEAT AND MOTOR VEHICLE WITH SUCH A MOTOR VEHICLE SEAT

(71) Applicant: GM GLOBAL TECHNOLOGY OPERATIONS LLC, Detroit, MI (US)

(72) Inventor: Joerg Wiegelmann, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/634,866

(22) Filed: Jun. 27, 2017

(65) Prior Publication Data

US 2018/0001795 A1  Jan. 4, 2018

(30) Foreign Application Priority Data

Jun. 30, 2016 (DE) ........................ 10 2016 008 070

(51) Int. Cl.
| | | |
|---|---|---|
| B60N 2/20 | (2006.01) | |
| B60N 2/56 | (2006.01) | |
| B60R 11/02 | (2006.01) | |
| H04B 5/00 | (2006.01) | |

(52) U.S. Cl.
CPC ............ *B60N 2/20* (2013.01); *B60N 2/5678* (2013.01); *B60R 11/0217* (2013.01); *B60R 11/0229* (2013.01); *H04B 5/0075* (2013.01)

(58) Field of Classification Search
CPC ..... B60N 2/20; B60N 2/5678; B60R 11/0229; B60R 11/0217; H04B 5/0075

USPC ............ 297/354.12, 378.1, 378.12, 378.14, 297/180.12, 217.3, 217.4, 361.1–375
See application file for complete search history.

(56) References Cited

U.S. PATENT DOCUMENTS

| | | | | |
|---|---|---|---|---|
| 4,264,849 A * | 4/1981 | Fleischer | ............ | B60N 2/0244 297/330 |
| 4,456,861 A * | 6/1984 | Ratzel | ...................... | G05B 9/02 318/103 |
| 4,470,632 A * | 9/1984 | Babbs | .................. | B60N 2/0232 297/330 |
| 4,547,718 A * | 10/1985 | Ratzel | .................. | B60N 2/0224 318/103 |
| 5,975,637 A * | 11/1999 | Geuss | .................... | B60N 2/002 297/354.12 X |
| 6,243,635 B1 * | 6/2001 | Swan | ..................... | B60N 2/002 701/49 |
| 7,093,871 B2 * | 8/2006 | Lim | .................. | B62D 33/0636 296/190.11 |
| 7,118,178 B2 * | 10/2006 | Daniels | ................ | B60N 2/0232 297/378.1 |
| 7,320,501 B2 * | 1/2008 | Keyser | ................. | B60N 2/3011 297/378.12 X |
| 7,556,315 B2 * | 7/2009 | Nathan | ................ | B60N 2/0224 297/378.1 |
| 7,931,337 B2 * | 4/2011 | Lawall | ..................... | B60N 2/22 297/354.12 |
| 7,965,170 B2 * | 6/2011 | Nathan | .................. | B60N 2/002 340/5.1 |

(Continued)

*Primary Examiner* — Rodney B White
(74) *Attorney, Agent, or Firm* — Lorenz & Kopf, LLP

(57) ABSTRACT

A motor vehicle seat includes a reclining or pivotable backrest, on which an electrical load is arranged and a transmission device for transmitting signals and/or power between the electrical load and a vehicle-side device. Signals and/or power can be contactlessly transmitted by the transmission device.

16 Claims, 1 Drawing Sheet

(56) References Cited

U.S. PATENT DOCUMENTS

| | | | | |
|---|---|---|---|---|
| 7,976,103 B2* | 7/2011 | Gamache | B60N 2/0232 297/378.1 X |
| 8,091,960 B2* | 1/2012 | Kincaid | B60N 2/5685 297/180.12 X |
| 8,500,194 B2* | 8/2013 | Fischer | B60N 2/002 297/180.12 X |
| 8,948,962 B2* | 2/2015 | Pywell | B60N 2/0228 297/378.12 |
| 9,387,776 B2* | 7/2016 | Mayer | B60N 2/0244 |
| 9,475,416 B2* | 10/2016 | DeForest | B60N 2/002 |
| 9,707,866 B2* | 7/2017 | Mayer | B60N 2/3009 |
| 9,840,330 B2* | 12/2017 | Dueser | B64D 11/0624 |
| 2004/0195892 A1* | 10/2004 | Daniels | B60N 2/0232 297/378.1 |
| 2006/0131911 A1* | 6/2006 | Lim | B62D 33/0636 296/26.08 |
| 2008/0009989 A1* | 1/2008 | Kim | B60N 2/0232 701/36 |
| 2011/0301809 A1* | 12/2011 | Pywell | B60N 2/0228 701/36 |
| 2014/0252813 A1* | 9/2014 | Lee | H02J 17/00 297/180.12 |
| 2015/0015044 A1* | 1/2015 | Teufel | B60N 2/2356 297/366 |
| 2015/0329018 A1* | 11/2015 | Mayer | B60N 2/3009 297/378.1 |

* cited by examiner

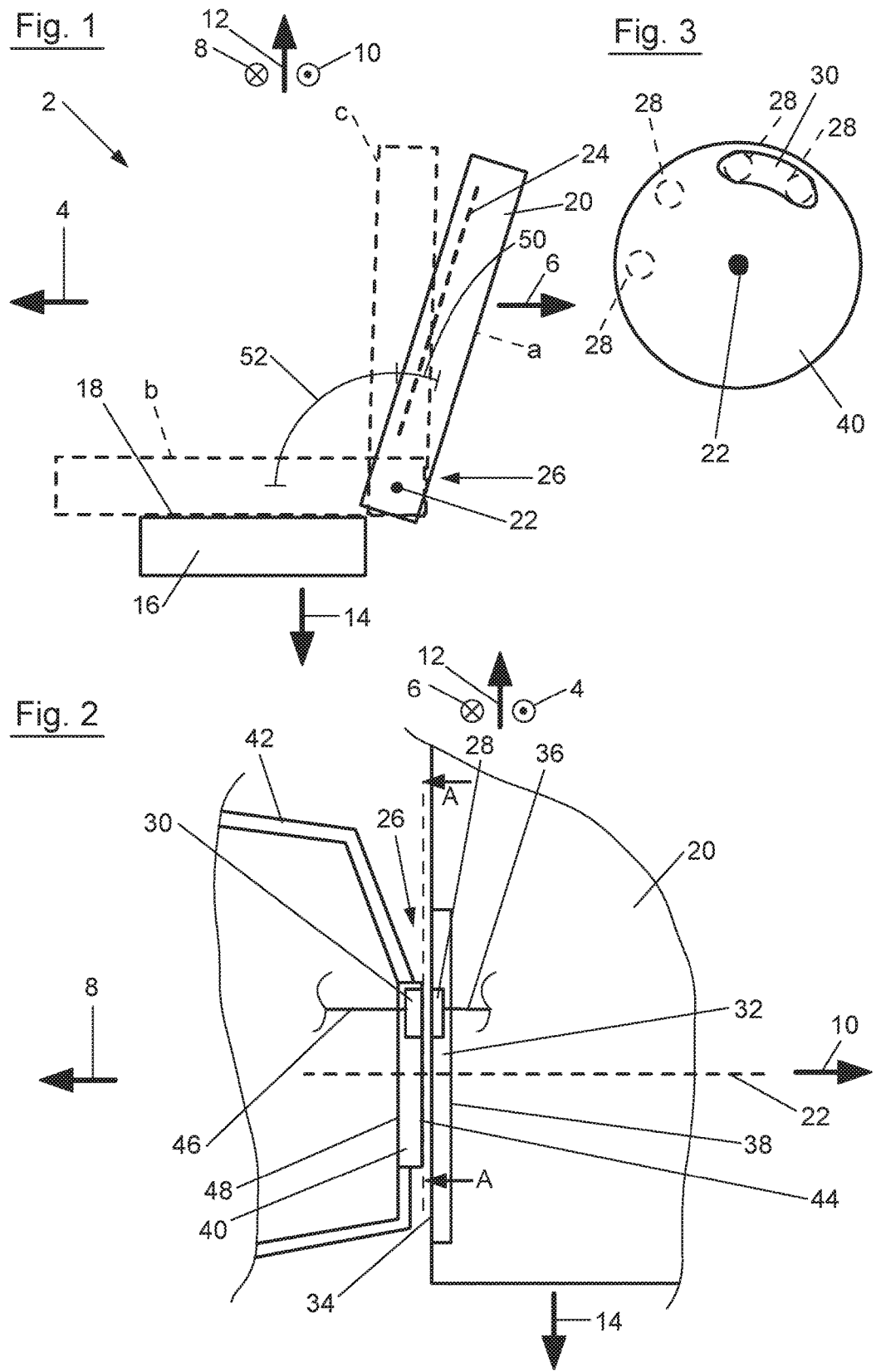

MOTOR VEHICLE SEAT AND MOTOR VEHICLE WITH SUCH A MOTOR VEHICLE SEAT

CROSS-REFERENCE TO RELATED APPLICATION

This application claims priority to German Patent Application No. 102016008070.1, filed Jun. 30, 2016, which is incorporated herein by reference in its entirety.

TECHNICAL FIELD

The present disclosure pertains to motor vehicle seats with a reclining or pivotable backrest, on which an electrical load is arranged, and a transmission device for transmitting signals and/or power between the electrical load and a vehicle-side device. In addition, the technical area relates to motor vehicles with at least one such motor vehicle seat.

BACKGROUND

Known from practice are motor vehicle seats that include a reclining or pivotable backrest, on which an electrical load, for example a seat heater, is arranged. In addition, the motor vehicle seats are provided with a transmission device for transmitting signals and/or power between the electrical load and a vehicle-side device. The known transmission devices general include a first transmission part, which is secured to the backrest, and a second transmission part, which is fixed on the vehicle side. In order to ensure that signals and/or power are transmitted via the transmission device and consider the relative movement between the first and second transmission parts while pivoting the backrest, the two transmission parts are most often connected by a flexible cable. Alternatively, use is also made of so-called sliding contacts between the first and second transmission parts.

While the problem with cables for connecting the transmission parts is that the latter can easily become damaged and also make assembly and disassembly more difficult, the problem with the sliding contacts is that they generate increased noise on the one hand, and tend to wear on the other, to the point where the transmission device can lose function. In addition, both connections have proven to be relatively installation space intensive.

Accordingly, there is a need to create a motor vehicle seat with a reclining or pivotable backrest, on which an electrical load is arranged, and a transmission device for transmitting signals and/or power between the electrical load and a vehicle-side device, in which the aforementioned problems are resolved.

SUMMARY

An embodiment of the present disclosure relates to a motor vehicle with a reclining or pivotable backrest. Arranged on the backrest is an electrical load, which may be a seat heater, a display screen or a loudspeaker. Also provided is a transmission device for transmitting signals and/or power between the electrical load and a vehicle-side device. The vehicle-side device may be a control and/or regulating device for the electrical load and/or a battery for supplying the electrical load with electrical energy. Therefore, the signals can be electrical signals, for example control and/or regulating signals. As opposed to transmission devices that include connecting cables or sliding contacts, the transmission device is configured to contactlessly transmit signals and/or power. On the one hand, this results in a relatively small installation space for the transmission device. On the other hand, a reliable function is ensured, especially since damage to connecting cables or the like is precluded. A lack of connecting cables also makes it especially simple to assemble and disassemble the motor vehicle seat. In addition, the lack of contacts eliminates any noises inside of the transmission device, for example as would be the case for sliding contacts, and thus also eliminates the need for corresponding noise reduction measures, thereby further simplifying the structural design.

In another embodiment of the motor vehicle seat according to the present disclosure, the transmission device is designed in such a way that the signals and/or power can be transmitted inductively or capacitively by the transmission device.

In another embodiment of the motor vehicle seat according to the present disclosure, the transmission device includes a first transmission part on the backrest and a fixed second transmission part contactlessly allocated to the first transmission part. For example, the transmission parts may include corresponding coils in the case of an inductive transmission.

In another embodiment of the motor vehicle seat according to the present disclosure, the second transmission part is arranged on the vehicle side, for example on the body of the motor vehicle, or on the seat substructure side, for example on a seat substructure of the motor vehicle seat.

In another embodiment of the motor vehicle seat according to the present disclosure, the backrest can be pivoted from an essentially upright use position, into which the backrest can also be locked, into an essentially horizontal nonuse position. In this way, a vehicle passenger can sit on the motor vehicle seat in the use position, and lean his or her back against the backrest. By contrast, in the essentially horizontal nonuse position, the back of the backrest can serve as an expanded loading surface.

In another embodiment of the motor vehicle seat according to the present disclosure, the first and second transmission parts in the use position are arranged relative to each other in such a way that the signals and/or power can be transmitted, thereby ensuring an actuation or regulation of the electrical load in the backrest or its power supply, at least in the use position.

In another advantageous embodiment of the motor vehicle seat according to the present disclosure, the first and second transmission parts in the nonuse position of the backrest are arranged relative to each other in such a way that attenuated signals and/or power can be transmitted or that signals and/or power are not transmitted, as opposed to the use position. The advantage to this is that the transmission device along with its transmission parts can be given a relatively small design, especially since the electrical load as a rule is not used in the nonuse position of the backrest, and consequently neither signals nor power must be transmitted.

In another embodiment of the motor vehicle seat according to the present disclosure, the backrest can be pivoted into only one use position or, within a predetermined first pivoting range, into two or more use positions, into which the backrest can again be locked. Several use positions here offer the advantage that the vehicle passenger can individually adjust his or her seating position.

In another embodiment of the motor vehicle seat according to the present disclosure, the first and second transmission parts are arranged relative to each other in the two or more use positions in such a way that the signals and/or power can be transmitted so as to ensure a reliable actuation, regulation of power supply for the electrical load, even in various use positions of the backrest.

In another embodiment of the motor vehicle seat according to the present disclosure, the first and second transmission parts are arranged relative to each other in a predetermined second pivoting range between the first pivoting range and nonuse position in such a way that attenuated signals and/or power can be transmitted or signals and/or power are not transmitted, or as opposed to the two or more use positions. Since the backrest in the mentioned second pivoting range is only moved from one of the several use positions into the nonuse positions without being locked in this second pivoting range, it is here also beneficial with regard to the required necessary installation space that an attenuated or even no transmission of signals take place via the transmission device in this second pivoting range, especially since the electrical load is as a rule no longer used when pivoting from one of the use positions into the nonuse position.

In another embodiment of the motor vehicle seat according to the present disclosure, in order to achieve an especially compact structural design for the transmission device, the first and second transmission parts overlap each other at least in the use position or use positions of the backrest as viewed in the direction of the pivoting axis of the backrest. By contrast, in the nonuse position of the backrest, the first and second transmission parts preferably do not overlap each other, so as to simplify the structural design of the transmission device and its space requirement, as already alluded to above. Alternatively, the first and second transmission parts can at least only partially overlap in the nonuse position, wherein this then applies to both transmission parts, which each only overlap in a partial area.

In another embodiment of the motor vehicle seat according to the present disclosure, the second transmission part is arranged on a plate that can be or is fastened to a body side, for example a sheet metal plate or plastic plate. It is here preferred that the second transmission part be arranged on the side of the plate facing the backrest. In this embodiment, it is also preferred that the pivoting axis of the backrest extend through the plate on which the second transmission part is arranged, wherein it is further preferred for space considerations that an electrical terminal of the second transmission part be arranged on the side of the plate facing away from the backrest.

In another embodiment of the motor vehicle seat according to the present disclosure, the first transmission part is arranged on a plate that can be or is fastened to a body side, for example a sheet metal plate or plastic plate. It is here preferred that the first transmission part be arranged on the side of the plate facing the second transmission part. It has further proven itself advantageous in this embodiment that the pivoting axis of the backrest extend through the plate, and that an electrical terminal of the first transmission part preferably be arranged on the side of the plate facing away from the second transmission part so as to achieve a simple structural design and economize on space.

As already indicated above, the electrical load in another embodiment of the motor vehicle seat according to the present disclosure is a seat heater, for example which can encompass heating oils, or a loudspeaker, which can be used, for example, to reproduce the sounds of a sound reproduction system, e.g., those of a CD player, radio or the like.

Another embodiment of the present disclosure relates to a motor vehicle, which includes at least one motor vehicle seat of the kind according to the present disclosure.

In another embodiment of the motor vehicle according to the present disclosure, the motor vehicle seat is arranged in the rear row of seats of the motor vehicle, where the latter preferably borders a motor vehicle trunk toward the front.

In another embodiment of the motor vehicle according to the present disclosure, the motor vehicle seat in the rear row of seats includes an exterior motor vehicle seat in the transverse direction, wherein the second transmission part and/or the plate on which the second transmission part is potentially fastened can in this case especially easily be arranged or fastened on the outer wall of the motor vehicle bordering the vehicle interior in the transverse direction or its body.

BRIEF DESCRIPTION OF THE DRAWINGS

The present disclosure will hereinafter be described in conjunction with the following drawing figures, wherein like numerals denote like elements.

FIG. 1 is a schematic side view of an embodiment of a motor vehicle seat;

FIG. 2 is a partial cross sectional view of the motor vehicle seat on FIG. 1 in the area of the transmission device; and FIG. 3 is a top view of the cutting line A-A on FIG. 2.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description FIG. 1 shows a schematic side view of a motor vehicle seat 2. The opposing longitudinal directions 4, 6, opposing transverse directions 8, 10 and opposing vertical directions 12, 14 of the motor vehicle seat 2 are denoted by corresponding arrows. The longitudinal direction 4 can also be referred to as the seat direction 4, which can here correspond to the forward direction of the motor vehicle in the installed state. Even if not depicted in any more detail, the motor vehicle seat 2 is to be arranged on the rearmost row of seats of a motor vehicle, so as to there include the outer motor vehicle seat 2 in the transverse direction 8 in the rearmost row of seats.

The motor vehicle seat 2 includes a seat part 16 with a seating surface 18 that points upwardly in the vertical direction 12. In addition, the motor vehicle seat 2 includes a backrest 20. The backrest 20 can be pivoted relative to the seat part 16 around a pivoting axis 22 extending in the transverse directions 8, 10. Further provided on or in the backrest 20 is an electrical load 24, for example a seat heater or a loudspeaker. Also provided is a transmission device 26 in the area of the pivoting axis 22, which serves to transmit signals and/or power between the electrical load 24 on the rear seat 20 on the one hand and a vehicle-side device on the other. The signals and/or power are contactlessly transmitted by the transmission device 26. The further structural design of the transmission device 26 will be described in more detail below drawing reference to FIGS. 1 and 2.

The transmission device 26 includes a first transmission part 28 on the backrest 20 and a fixed second transmission part 30 that is contactlessly allocated to the first transmission part 28, and here arranged on the vehicle side, or alternatively also on the seat substructure side. Signals and/or the necessary power can be inductively or capacitively transmitted between the two transmission parts 28, 30. The first transmission part 28 is here arranged on a plate 32 that is fastened on the backrest side, which is fastened on the side of the backrest 20 facing in the transverse direction 8. The first transmission part 28 is here arranged on the side 34 of the plate 32 that faces the second transmission part 30 or points in the transverse direction 8. As further evident from FIG. 2, the plate 32 along with the first transmission part 28 is arranged or fastened on the backrest 20 in such a way that the pivoting axis 22 of the backrest 20 extends through the plate 32. In addition, the first transmission part 28 has allocated to it an electrical terminal 36, which connects the first transmission part 28 with the electrical load, which was not depicted on FIG. 2. The electrical terminal 36 is here arranged on the side 38 of the plate 32 facing away from the second transmission part 30.

The second transmission part 30 is arranged on a plate 40 fastened on the body side. As evident from FIG. 2, the plate 40 is fastened to a body section 42 of the motor vehicle. The second transmission part 30 is arranged on the side 44 of the plate facing the backrest 20 in a transverse direction 10. The plate 40 is arranged in such a way that the pivoting axis 22 of the backrest 20 extends through the plate 40. The second transmission part 30 has allocated to it an electrical terminal 46, which is arranged on the side 48 of the plate 40 facing away from the backrest 20. The electrical connection 46 here serves to establish a connection with the aforementioned vehicle-side device, for example a music system and/or a power source, for example the vehicle battery.

As denoted on FIG. 1, the backrest 20 can be pivoted from an essentially upright use position (a) around the pivoting axis 22 into an essentially horizontal nonuse position (b). The backrest 20 can be locked at least into the essentially upright use position a. In addition, the backrest 20 can be pivoted into not just one use position (a), but rather into two or more use positions (a, c) within a predetermined first pivoting range 50. The respective backrest 20 can be locked into the mentioned use positions (a, c). In addition, there is a second pivoting range 52 between the first pivoting range 50 and nonuse position (b), in which the backrest 20 can be pivoted from the respective use position (a, c) into the nonuse position (b) without the option of being locked.

FIG. 3 illustrates the position of the first transmission part 28 relative to the second transmission part 30 in the various pivoting positions of the backrest 20. The first and second transmission parts 28, 30 are arranged in such a way relative to each other in the two or more use positions (a, c) that the signals and/or power can be transmitted, as denoted based on the corresponding position of the first transmission part 28 relative to the second transmission part 30 on FIG. 3, in which the first and second transmission parts 28, 30 overlap each other in use positions (a, c) of the backrest as viewed in the direction of the pivoting axis 22, i.e., in the transverse directions 8, 10. By contrast, if the backrest 20 is pivoted within the second pivoting range 52, the two transmission parts 28, 30 do not overlap each other as viewed in the transverse directions 8, 10, so that attenuated signals and/or power can only be transmitted or that signals and/or power are not transmitted, as opposed to the two or more use positions (a, c). The same holds true for the nonuse position b of the backrest 20, in which the two transmission parts 28, 30 do not overlap each other as viewed in the transverse directions 8, 10, so that attenuated signals and/or power can only be transmitted or that signals and/or power are not transmitted, or as opposed to the two or more use positions (a, c).

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A motor vehicle seat comprising
a seat part having a seating surface;
a backrest pivotably positionable relative to the seating surface and having an electrical load arranged thereon;
a vehicle-side device; and
a transmission device operably coupled between the vehicle side device and the backrest and configured to contactlessly transmit an electrical signal between the vehicle-side device and the electrical load.

2. The motor vehicle seat according to claim 1, wherein the transmission device is configured to inductively transmit the electrical signal by the transmission device.

3. The motor vehicle seat according to claim 1, wherein the transmission device is configured to capacitively transmit the electrical signal by the transmission device.

4. The motor vehicle seat according to claim 1, wherein the transmission device comprises a first transmission element arranged on the backrest and a second transmission element arranged on at least one of a vehicle side structure or a seat substructure adjacent to but not in contact with the first transmission element.

5. The motor vehicle seat according to claim 4, wherein the backrest is pivotably positionable from an upright, locked use position into a horizontal, nonuse position, wherein the first and second transmission elements are configured to contactlessly transmit the electrical signal between the vehicle-side device and the electrical load when the backrest is in the use position.

6. The motor vehicle seat according to claim 5, wherein the first and second transmission elements are configured to contactlessly transmit an attenuated electrical signal between the vehicle-side device and the electrical load when the backrest is in the nonuse position.

7. The motor vehicle seat according to claim 5, wherein the first and second transmission elements are configured to not transmit the electrical signal between the vehicle-side device and the electrical load when the backrest is in the nonuse position.

8. The motor vehicle seat according to claim 7, wherein the first and second transmission elements overlap each other at least in the use position of the backrest, and do not overlap each other in the nonuse position.

9. The motor vehicle seat according to claim 5, wherein the backrest is configured to pivot within a predetermined first pivoting range having two or more use positions into which the backrest can be locked, wherein the first and second transmission elements are configured to contactlessly transmit the electrical signal between the vehicle-side device and the electrical load when the backrest is in the two or more use positions.

10. The motor vehicle seat according to claim 9, wherein the backrest is configured to pivot within a predetermined second pivoting range between the first pivoting range and the nonuse position, wherein the first and second transmission elements are configured to contactlessly transmit an attenuated electrical signal between the vehicle-side device and the electrical load when the backrest is in the second pivoting range.

11. The motor vehicle seat according to claim 9, wherein the backrest is configured to pivot within a predetermined second pivoting range between the first pivoting range and the nonuse position, wherein the first and second transmission elements are configured to not transmit the electrical signal between the vehicle-side device and the electrical load when the backrest is in the nonuse position.

12. The motor vehicle seat according to claim 5, wherein the second transmission element is arranged on a vehicle-side plate fastened to the plate facing the backrest, wherein a pivoting axis of the backrest extends through the plate, and an electrical terminal of the second transmission element is arranged on a side of the plate facing away from the backrest.

13. The motor vehicle seat according to claim 12, wherein the first transmission element is arranged on a backrest plate fastened to a side of the backrest facing the second transmission element, wherein the pivoting axis of the backrest extends through the backrest plate, and an electrical terminal of the first transmission element is arranged on the side of the backrest plate facing away from the second transmission element.

14. The motor vehicle seat according to claim 1, wherein the electrical load is selected from a group consisting of a seat heater and a loudspeaker.

15. A motor vehicle comprising a vehicle body having a front seat position and a rear seat position located behind the front seat position and at least one motor vehicle seat according to claim 1 arranged in the rear seat position.

16. A motor vehicle seat comprising
a seat part having a seating surface;
a backrest pivotably positionable relative to the seating surface and having an electrical load arranged thereon, the backrest being pivotably positionable from an upright, locked use position into a horizontal, nonuse position;
a vehicle-side device; and
a transmission device operably coupled between the vehicle side device and the backrest and configured to contactlessly transmit an electrical signal between the vehicle-side device and the electrical load, the transmission device comprising a first transmission element arranged on the backrest and a second transmission element arranged on at least one of a vehicle side structure or a seat substructure adjacent to but not in contact with the first transmission element, wherein the first and second transmission elements are configured to contactlessly transmit the electrical signal between the vehicle-side device and the electrical load when the backrest is in the use position and are configured to not transmit the electrical signal between the vehicle-side device and the electrical load when the backrest is in the nonuse position.

* * * * *